United States Patent
Peake et al.

(10) Patent No.: US 10,551,504 B2
(45) Date of Patent: Feb. 4, 2020

(54) METHOD AND SYSTEM FOR SHARING CONVERGENCE DATA

(71) Applicant: Trimble Inc., Sunnyvale, CA (US)

(72) Inventors: John Peake, Sunnyvale, CA (US);
Gregory Best, San Francisco, CA (US);
Peter Loomis, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 532 days.

(21) Appl. No.: 15/284,975

(22) Filed: Oct. 4, 2016

(65) Prior Publication Data
US 2018/0095177 A1    Apr. 5, 2018

(51) Int. Cl.
*G01S 19/07* (2010.01)
*G01S 19/40* (2010.01)
*G01S 19/44* (2010.01)

(52) U.S. Cl.
CPC .............. *G01S 19/07* (2013.01); *G01S 19/40* (2013.01); *G01S 19/44* (2013.01)

(58) Field of Classification Search
CPC .......... G01S 19/07; G01S 19/05; G01S 19/09; G01S 19/40–41; G01S 19/43–44; G01S 19/04; G01S 19/14; G01S 19/32
See application file for complete search history.

(56) References Cited

U.S. PATENT DOCUMENTS

| | | | |
|---|---|---|---|
| 7,961,141 B2 * | 6/2011 | Dai | G01S 19/43 342/357.24 |
| 9,958,550 B2 * | 5/2018 | Chen | G01S 19/40 |
| 2002/0098849 A1 * | 7/2002 | Bloebaum | G01S 5/0072 455/456.3 |
| 2017/0269216 A1 * | 9/2017 | Dai | G01S 19/44 |

FOREIGN PATENT DOCUMENTS

| | | |
|---|---|---|
| WO | 2015/099194 A1 | 7/2015 |
| WO | 2018/067395 A1 | 4/2018 |

OTHER PUBLICATIONS

Collins, P. et al., "External Ionospheric Constraints for Improved PPP-AR Initialisation and a Generalized Local Augmentation Concept," GNSS 2012—Proceedings of the 25th International Technical Meeting of the Satellite Division of the Institute of Navigation, the Institute of Navigation, Nashville, TN, Sep. 21, 2012, pp. 3055-3065.

The International Search Report and Written Opinion for Application No. PCT/US2017/054341, dated Jan. 17, 2018, 15 pages.

* cited by examiner

*Primary Examiner* — Cassi J Galt
(74) *Attorney, Agent, or Firm* — Kilpatrick Townsend & Stockton LLP

(57) ABSTRACT

Systems and methods for sharing convergence data between GNSS receivers are disclosed. Convergence data received at a GNSS receiver via a communication connection may be utilized to determine a position of the GNSS receiver.

17 Claims, 10 Drawing Sheets

METHOD AND SYSTEM FOR SHARING CONVERGENCE DATA

BACKGROUND

The Global Positioning System (GPS) and its counterparts in the Global Navigation Satellite System (GNSS) have become thoroughly pervasive in all parts of human society. GPS and GNSS receivers are increasingly being integrated into devices, tools, and vehicles such as agricultural vehicles, construction equipment, and even in autonomously operated vehicles. In order to provide position measurements with a necessary degree of precision, GNSS receivers may be configured to utilize corrections from various sources. Examples of these correction systems include, for example, the Wide Area Augmentation System (WAAS), the Satellite-Based Augmentation System (SBAS), the Real-time Kinematic (RTK) technique, the Precise Point Positioning (PPP) technique, the European Geostationary Navigation Overlay Service (EGNOS), and the like. Using correction data from these sources, a GNSS receiver can account for error sources such as atmospheric delay of GNSS signals, clock errors, and ephemeris errors to derive a more precise position fix.

When a GNSS receiver (or rover) uses correction data from a single reference station (e.g., differential GPS (DGPS) or RTK), there are small bias errors in the corrections for each satellite that are subject to both temporal and spatial decorrelation. With temporal decorrelation, the correction data degrades as time increases since the reference measurements were taken. With spatial decorrelation, the correction data degrades as distance increases between the rover and the site where the reference measurements were taken.

These correction bias errors also exist in systems that use networked reference stations such as SBAS or PPP. Because there is no reference station at the exact rover site, there will be small correction bias errors. These errors are influenced most heavily by atmospheric conditions—ionospheric model error and tropospheric model error. These correction bias errors will be similar for all rovers within a few kilometers of each other, and will change slowly over time, on the order of minutes, as atmospheric conditions change.

By observing the corrections over a large number of measurements, the rover can estimate the correction bias errors. This process, called convergence, can substantially reduce the magnitude of measurement error. A detailed discussion of typical convergence techniques is found in "IMPROVED CONVERGENCE FOR GNSS PRECISE POINT POSITIONING", by S. Banville, Ph.D. dissertation, Department of Geodesy and Geomatics Engineering, Technical Report No. 294, University of New Brunswick, Fredericton, New Brunswick, Canada, which is incorporated herein by reference. If enough measurements are taken, and the network model is of sufficiently high fidelity, it may be possible for the bias error estimates to converge to centimeter level accuracy, in which case it may be possible to resolve carrier phase ambiguities to provide a position fix with centimeter level accuracy. This occurs more quickly on a multi-frequency band rover where the ionospheric model error is not as onerous as on a single frequency band rover. However, even without full integer ambiguity resolution, a single frequency band rover will benefit from reduced correction bias errors, and can often attain positioning to sub-meter accuracy after sufficient convergence. Thus, systems and methods for reducing convergence times are desired.

BRIEF DESCRIPTION OF THE DRAWINGS

The accompanying drawings illustrate embodiments that, together with the detailed description, serve to explain various features and principles of some embodiments. Unless noted, the drawings referred to in this brief description should be understood as not being drawn to scale. Herein, like items are labeled with like item numbers.

DESCRIPTION OF EMBODIMENTS

Reference will now be made in detail to various embodiments, examples of which are illustrated in the accompanying drawings. While various examples are discussed herein, it will be understood that they are not intended to limit the embodiments. On the contrary, the scope of this application is intended to cover alternatives, modifications, and equivalents, which may be included within the spirit and scope of the various embodiments as described herein and defined by the appended claims. Furthermore, numerous specific details are set forth in order to provide a thorough understanding of embodiments of the present subject matter. However, embodiments may be practiced without these specific details. In other instances, well known methods, procedures, components, and circuits have not been described in detail so as to not unnecessarily obscure aspects of the described embodiments.

Rovers can estimate correction bias errors by observing a large number of measurements. These bias estimates are refinements to correction data received from external sources such as base stations or network control centers. The convergence process can improve bias estimates allowing increased accuracy in position measurements performed by the rover. The convergence process is time consuming, however, and can take up to a half hour before sufficiently refined convergence data is obtained. Multi-frequency band rovers typically achieve convergence more quickly than single-frequency band rovers, but the convergence process takes time for all rovers regardless of their capabilities.

Since correction bias errors are common to all rovers in the same approximate area, one rover that is un-converged (or operating in a non-converged state) can use the bias estimates (or convergence data) that have been generated by another nearby rover that has already converged. The form of the convergence data passed from one rover to another may vary according to the particular rover models, so it is expected that both rovers use similar systems in some embodiments. Typical convergence data might include adjustments (or refinements) to the atmospheric models. The convergence data may also include orbit models and/or satellite clock errors. By using bias estimates from another rover that has already converged, the convergence time can be reduced.

Figure 1:
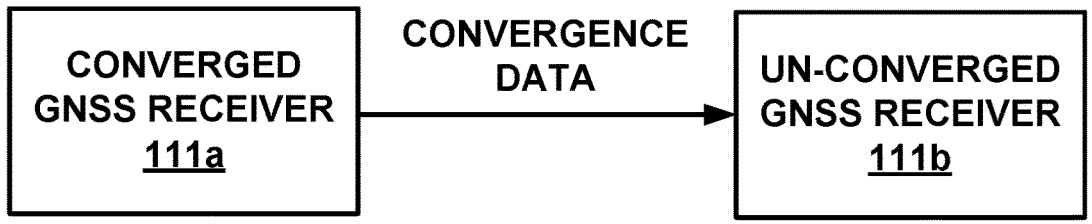
FIG. 1 is a simplified diagram showing a GNSS receiver sending convergence data to another GNSS receiver in accordance with various embodiments.

FIG. 1 is a simplified diagram showing a GNSS receiver sending convergence data to another GNSS receiver in accordance with various embodiments. In this example, a first GNSS receiver 111a that is in a converged state sends its convergence data to a second GNSS receiver 111b that is in an un-converged state. The convergence data may be used by the second GNSS receiver 111b to determine position measurements. Receiving and using the convergence data from the first GNSS receiver 111a allows the second GNSS receiver 111b to accurately determine its position much more quickly than if it were to generate its own convergence data using conventional processes.

The convergence data may be shared between the GNSS receivers using wired or wireless communication connections. In some embodiments, for example, the convergence data is shared using wireless radio, cellular, and/or satellite communication connections. The GNSS receivers may be either mobile or stationary. Mobile GNSS receivers may be those that are arranged in a handheld device (e.g., handheld GPS or cellular telephone), arranged in a larger movable device (e.g., survey rover), or integrated as part of a larger mobile structure (e.g., vehicle or tractor). The GNSS receivers shown in FIG. 1 may be different (e.g., the first GNSS receiver 111a may be arranged in a cellular telephone while the second GNSS receiver 111b may be arranged in a survey rover), but they will typically use similar differential positioning techniques (e.g., PPP techniques).

The convergence data provided by the first GNSS receiver 111a to the second GNSS receiver 111b may include refinements to correction data. The correction data is received from external sources. The correction data is data that is used in PPP (PPP correction data) or other differential positioning techniques. The correction data may include atmospheric models (e.g., ionospheric and/or tropospheric modeling errors), orbit models (e.g., ephemeris data), and/or satellite clock errors. The correction data may be produced at a central location where precise orbits and clocks of all tracked navigation satellites are generated and updated in real time. Atmospheric conditions that delay the propagation of the signals from the satellites may also be determined. The correction data is broadcast or otherwise provided to GNSS receivers, typically by satellite service or cellular link, but can be done by any of a number of communications links.

One or more processors in the GNSS receiver utilize the correction data along with other signal measurements to produce convergence data that allows centimeter level positioning. As an example, PPP correction data may be used to generate PPP convergence data. In addition to refined correction data, the convergence data may also include code phase and/or carrier phase measurements, resolved carrier phase ambiguities, an uncertainty estimate of each code phase and/or carrier phase bias, correlations associated with each received GNSS signal, and time-tags for each received GNSS signal. The convergence data may also include one or more position fixes of the first GNSS receiver 111a and/or how long continuous tracking of GNSS signals from particular satellites has been maintained. The second GNSS receiver 111b can use the convergence data to achieve centimeter level precision almost immediately rather than generating its own convergence data using conventional processes.

Figure 2:
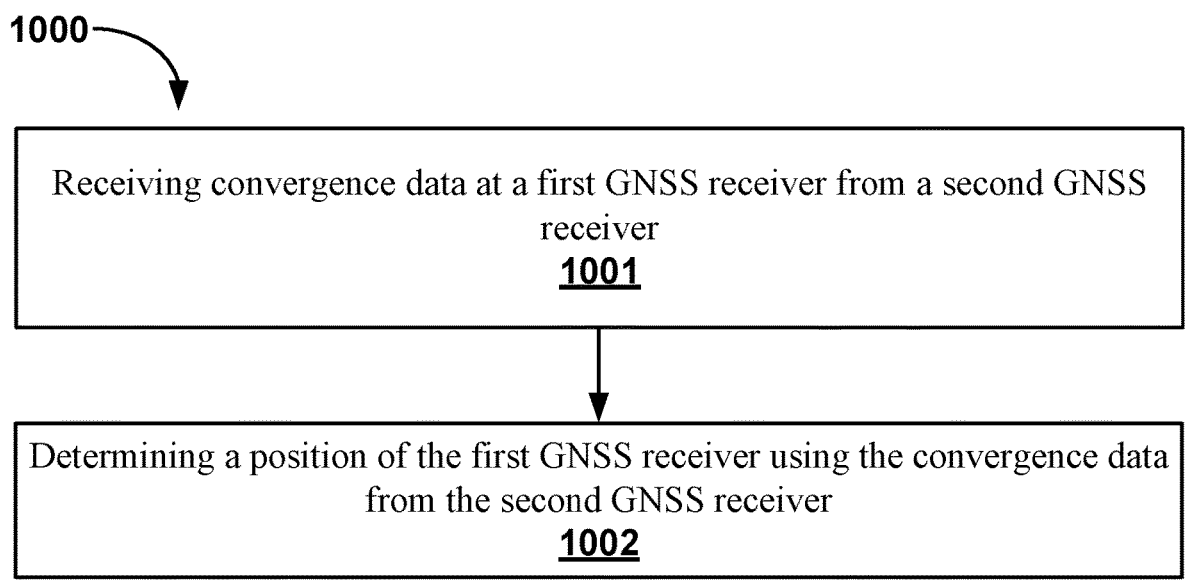
FIG. 2 is a flowchart of a method for sharing convergence data between GNSS receivers in accordance with various embodiments.

FIG. 2 is a flowchart of a method for sharing convergence data between GNSS receivers in accordance with various embodiments. The method includes receiving convergence data at a first GNSS receiver from a second GNSS receiver (1001). The first GNSS receiver is operating in a non-converged state and the second GNSS receiver is operating in a converged state. The convergence data is generated at the second GNSS receiver using correction data from one or more base stations. The first GNSS receiver and/or the second GNSS receiver may be mobile GNSS receivers, and the convergence data may be PPP convergence data. The method also includes determining a position of the first GNSS receiver using the convergence data received from the second GNSS receiver (1002).

FIGS. 3A-3C and 4A-4F and the accompanying text provide examples of specific applications where convergence data can be used by GNSS receivers to quickly obtain accurate position measurements. These examples illustrate the usefulness of sharing convergence data. It is recognized that the various embodiments described herein may be extended to many other receiver-to-receiver applications, and while many of the following examples describe vehicle-to-vehicle implementations, these implementations could be extended to any combination of vehicles, mobile devices, drones, survey receivers, geographic information system (GIS) devices, equipment for mining or agriculture, manned or unmanned aircraft, cranes, and the like.

Figure 3A:
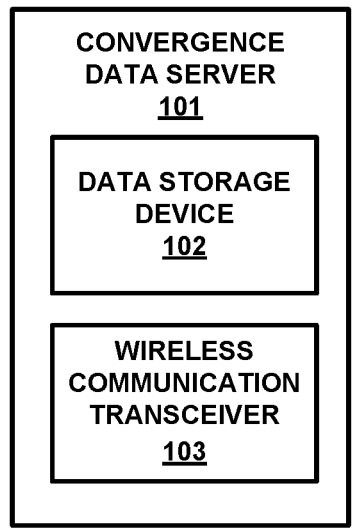
FIGS. 3A-3C are block diagrams of components of a convergence data sharing system in accordance with various embodiments.

FIG. 3A shows some components used in a convergence data sharing system 100 in accordance with various embodiments. In FIG. 3A, convergence data sharing system 100 comprises a convergence data server 101 that further comprises a data storage device 102 and a wireless communication transceiver 103. For the purpose of the present application, the term "convergence data server" refers to a device that receives, stores, and communicates convergence data. In accordance with various embodiments, convergence data server 101 may comprise a computer system that is configured to receive convergence data (e.g., using wireless communication transceiver 103) from a converged GNSS receiver, to store the convergence data (e.g., in data storage device 102), and to convey the convergence data to another GNSS receiver that may or may not be in a converged state. In accordance with various embodiments, the convergence data may be conveyed from convergence data server 101 to the GNSS receiver directly or via an intervening communication device.

The data storage device 102 may be any type of device configured for data storage. The data storage device 102 may be integrated with another device, such as the convergence data server 101, or it may be a separate device. Also, the data storage device 102 may be configured for temporary or permanent data storage. Other examples of data storage devices are provided throughout the description.

In accordance with various embodiments, convergence data sharing system 100 can receive the convergence data from, for example, a passing car having a converged GNSS receiver that conveys this data to convergence data sharing system 100 via wireless communication transceiver 103. When another vehicle having a non-converged GNSS receiver passes by, convergence data server 101 may detect the GNSS receiver and convey the convergence data via wireless communication transceiver 103. The passing vehicle can then use the convergence data to quickly achieve accurate positioning.

In accordance with various embodiments, convergence data server 101 may select from a plurality of convergence data based upon at least one criteria as described more fully below. In accordance with at least one embodiment, the criteria may also be conveyed from convergence data server 101 to the GNSS receiver which may use that data to perform its own selection process.

The United States Department of Transportation (U.S-.D.O.T.) has been conducting research in cooperation with automotive manufacturers to developing a system that utilizes vehicle-to-vehicle communications to wirelessly exchange vehicle-based data such as location, position, and speed (also referred to as V2V systems). Using this information, a vehicle will be able to maintain awareness of other nearby vehicles, calculate potential risks, issue warnings, or take pre-emptive actions to avoid dangerous situations. In general, the vehicular networks comprise two types of nodes: vehicles and roadside stations. Both types of nodes utilize a dedicated short-range communications (DSRC) network. The specification for the DSRC network prescribes operation in the 5.9 GHz band with a bandwidth of 75 MHz and an approximate range of 1000 meters. Two categories of standards provide outlines for vehicular networks. These standards constitute a category of IEEE standards for a special mode of operation designed for vehicular networks. IEEE 802.11p is an extension to the 802.11 Wireless LAN medium access layer (MAC) and physical layer (PHY) specification. IEEE 802.11p aims to provide specifications needed for MAC and PHY layers for specific needs of vehicular networks. The IEEE 1609 is a family of standards that is directed to management and security of the DSRC network. In accordance with various embodiments, wireless communication transceiver 103 is compliant with the IEEE 802.11p specification for implementing a DSRC network. However, it is noted that in accordance with various embodiments, other types of wireless communication transceivers can be implemented as described in greater detail below.

Some of the examples provided herein are described with reference to V2V systems. It should be appreciated that these examples may be extended to any vehicle-to-infrastructure (V2I) or vehicle to anything (V2X) implementations.

Figure 3B:
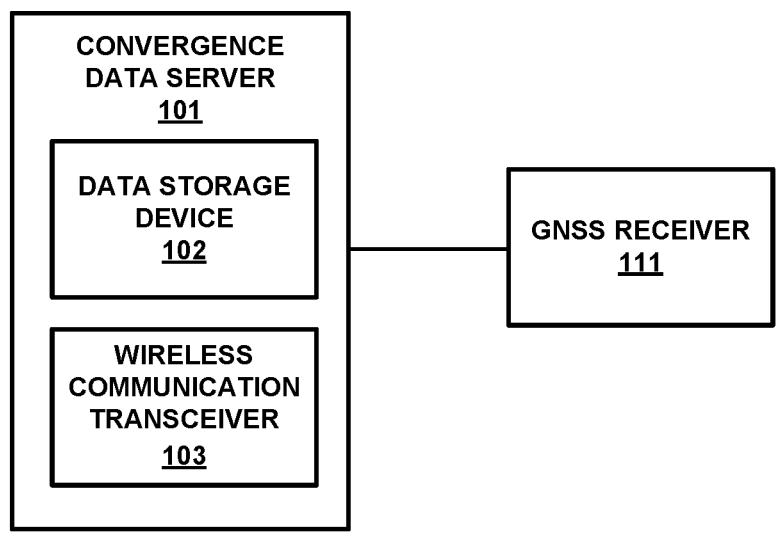

FIG. 3B shows components used in a convergence data sharing system 110 for sharing convergence data in accordance with various embodiments. For the purpose of brevity, the components described above with reference to FIG. 3A will not be described again in detail. In FIG. 3B, convergence data sharing system 110 comprises a convergence data server 101. The convergence data server 101 further comprises a data storage device 102 and a wireless communication transceiver 103 as described above. In FIG. 3B, convergence data sharing system 110 further comprises a GNSS receiver 111 coupled with convergence data server 101.

In accordance with various embodiments, once GNSS receiver 111 has achieved convergence, it will determine new convergence data on an epoch-by-epoch basis (e.g., each second, each half second, etc.) and store the convergence data in data storage device 102. In accordance with various embodiments, GNSS receiver 111 comprises a multi-frequency band GNSS receiver. For example, GNSS receiver 111 may be configured to receive and process GPS signals in the L1, L2C, and/or L5 frequency bands. This is advantageous since receiving GNSS signals in multiple frequency bands tends to shorten the time for GNSS receiver 111 to autonomously achieve convergence. The use of two or more GNSS frequency bands from the same satellite facilitates determining ionospheric effects, since the ionospheric effects are in part dependent upon the radio frequency. The GNSS signals on various frequency bands may be phase locked (e.g., in phase with each other) since the same clock signal is used at the broadcasting satellite to modulate the signals. The timing difference between the reception of two or more GNSS signals is largely a function of the atmospheric conditions and broadcast frequency bands of the two or more signals. Thus, various embodiments use differences in the time the signals were received to determine the electron density of the ionosphere. In so doing, the ionospheric delay of GNSS signals can be removed from the determination of the satellite-receiver distance to improve positioning accuracy.

Furthermore, by using two GNSS frequency bands from the same satellite, a process known as "wide-laning" can be performed. Using GPS as an example, the L2C or L5 signal band (e.g., 1227.60 MHz or 1176.45 MHz frequency bands respectively) may be subtracted from the L1 signal band (e.g., 1575.41 MHz frequency band). This results in a third signal with a frequency band of 347.81 MHz when the L2C signal band is used or a frequency band of 398.45 MHz when the L5 signal band is used. This lower frequency band signal has a correspondingly longer wavelength. As a result, it is easier to narrow the field of candidate carrier integers which are then processed to determine the corresponding carrier integer. In accordance with various embodiments, wide-laning may be used to expedite re-acquisition of the L1 carrier phase signal. In another embodiment, a process known as "tri-laning" can be performed in which the L2C signal band is subtracted from the L1 signal band and the L5 signal band is subtracted from the L1 signal band. The resulting lower frequency signals overlap to some extent and this allows narrowing the field of candidate integers which are then processed to determine the corresponding carrier integer.

Thus, in some embodiments, once convergence has been achieved, the biases received for the L1 signal band from a given satellite are usable by an L1-only user who receives the L1 biases from convergence data server 101. In other words, while receiver 111 may resolve the biases in the L1, L2/L2C, and/or L5 frequency band range, it may pass the biases of only one (e.g., L1, L2C, or L5) frequency band range to a passing vehicle in some embodiments. Other GNSS systems besides GPS may share convergence data in a similar manner.

In accordance with various embodiments, convergence data sharing system 110 can autonomously derive the convergence data described above that is then shared (e.g., conveyed using wireless communication transceiver 103) to a non-converged GNSS receiver such as in a car, truck, other vehicle, or any other receiver-to-receiver implementation. In accordance with various embodiments, convergence data sharing system 110 can query a passing vehicle as to whether it needs convergence data. Alternatively, a convergence data sharing system 110 located in a vehicle which is not currently converged can generate a query to determine whether there are any proximate convergence data servers (e.g., 101 of FIGS. 3A, 3B, and/or 3C) that have current convergence data available for sharing. In accordance with some embodiments, current convergence data is data that has been generated less than some threshold (e.g., 5 minutes) from the current time.

In accordance with various embodiments, convergence data sharing system 110 can be installed at various locations where traffic is likely to pass, such as highway on-ramps, entrances/exits of tunnels, bridges, parking structures, fire stations, etc. When a passing vehicle is detected using the V2V communication protocol, for example, convergence data sharing system 110 can provide the convergence data to the GNSS receiver of that vehicle to facilitate convergence of the receiver. In so doing, the vehicle will be able to achieve convergence of its own GNSS receiver almost instantly upon reception of the convergence data.

Additionally, in accordance with various embodiments, convergence data sharing system 110 can be located in another vehicle. In other words, a converged GNSS receiver 111 located in a vehicle can pass the convergence data to another nearby vehicle. The other vehicle can then use the convergence data to facilitate convergence of its receiver.

Figure 3C:
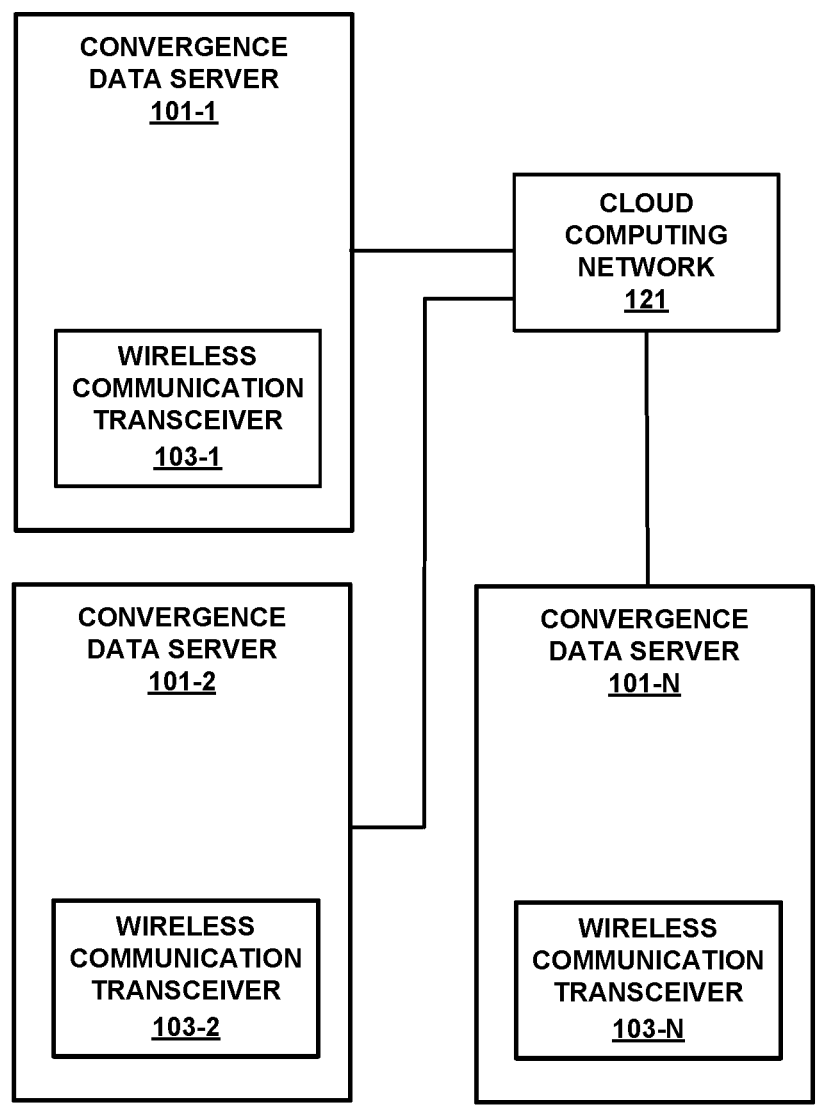

FIG. 3C shows components used in a convergence data sharing system 120 for sharing convergence data in accordance with various embodiments. For the purpose of brevity, the components described above with reference to convergence data sharing systems 100 and 110 of FIGS. 3A and 3B respectively will not be described again in detail. In FIG. 3C, system 120 comprises a plurality of convergence data servers (e.g., 101-1, 101-2, and 101-N) that are respectively in communication with a cloud computing network 121 via a data connection enabled by their respective wireless communication transceivers (e.g., 103-1, 103-2, ... 103-N).

In accordance with various embodiments, the data connection between convergence data servers 101-1, 101-2, and 101-N and cloud computing network 121 can be a wired data connection, a wireless data connection, or a combination of both. It is noted that there is no limit on how many convergence data servers 101 can be coupled with cloud computing network 121 in accordance with various embodiments.

In FIG. 3C, cloud computing network 121 is used as the data storage device of convergence data servers 101-1, 101-2, and 101-N in place of or in conjunction with a local data storage device. In accordance with various embodiments, cloud computing network 121 is configured to collect, store, and disseminate convergence data that is indexed by time and location. For example, cloud computing network 121 may be coupled with one or more of convergence data servers 101-1, 101-2, and 101-N and configured to receive and store convergence data that has been conveyed to them. Later, a vehicle passing one of the convergence data servers 101-1, 101-2, and 101-N can convey a request for current convergence data for the location at which it is located. Convergence data servers 101-1, 101-2, and 101-N may then pass the request for convergence data, along with the current time and location, to cloud computing network 121. Cloud computing network 121 may determine whether there is any usable convergence data available (e.g., current within a predetermined time period and within a predetermined radius of the querying vehicle). If cloud computing network 121 determines that there is usable convergence data available, it will forward it to the appropriate data servers 101-1, 101-2, 101-N, which will forward it to the vehicle using a wireless communication transceiver 103.

Figure 4A:
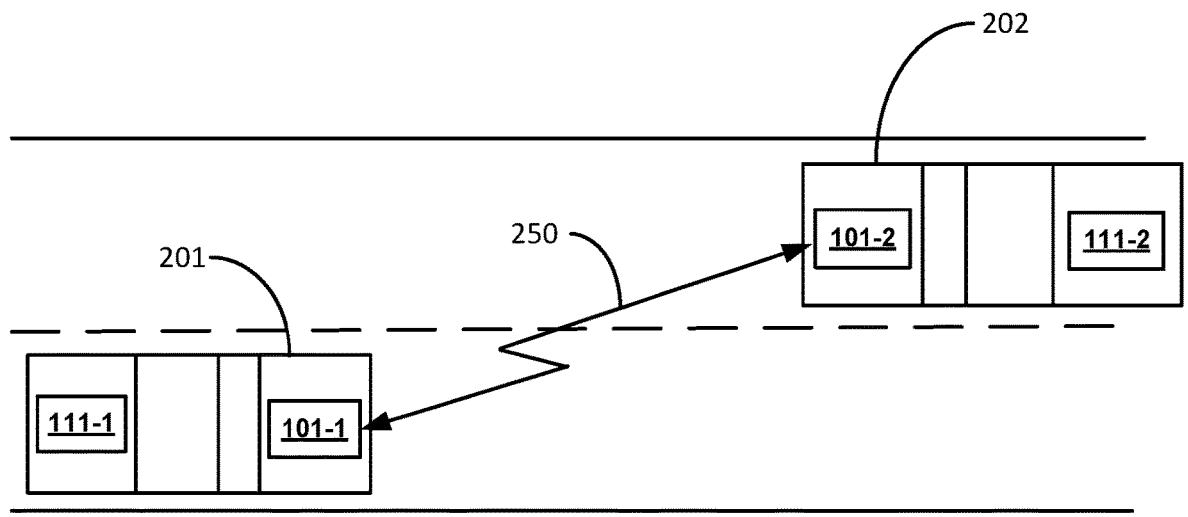
FIG. 4A-4F show the use of systems for sharing convergence data in accordance with various embodiments.

FIG. 4A shows the use of a system for sharing convergence data in accordance with various embodiments. In FIG. 4A, a first vehicle 201 comprising a first convergence data sharing system (e.g., convergence data server 101-1 and GNSS receiver 111-1) is passing a second vehicle 202 also comprising a second convergence data sharing system (e.g., convergence data server 101-2 and GNSS receiver 111-2). For the purposes of illustration, it is assumed that GNSS receiver 111-1 is a converged GNSS receiver and GNSS receiver 111-2 is a non-converged GNSS receiver. Typically, a V2V system will operate in a mode in which it is searching for and discovering other V2V systems in its vicinity. As the V2V standard allows for a range of approximately 1000 meters, it is only capable of discovering other V2V devices within a limited area. In accordance with various embodiments, when the GNSS receiver of a vehicle is not in a converged state, the wireless communication transceiver may convey a message indicating that convergence data is needed to other V2V systems in its vicinity. In FIG. 4A, once convergence data servers 101-1 and 101-2 have established communications (e.g., communication connection 250), convergence data server 101-2 will send a message indicating that GNSS receiver 111-2 is not operating in a converged state or is seeking convergence data. In accordance with various embodiments, once convergence data server 101-1 receives the message, it will access its own data storage device and retrieve the most recent convergence data. Convergence data server 101-1 will then send the convergence data to convergence data server 101-2 of second vehicle 202.

In a similar manner, if GNSS receiver 111-2 is operating in converged state, convergence data server 101-2 may "advertise" this status or information to other V2V systems in its vicinity.

Figure 4B:
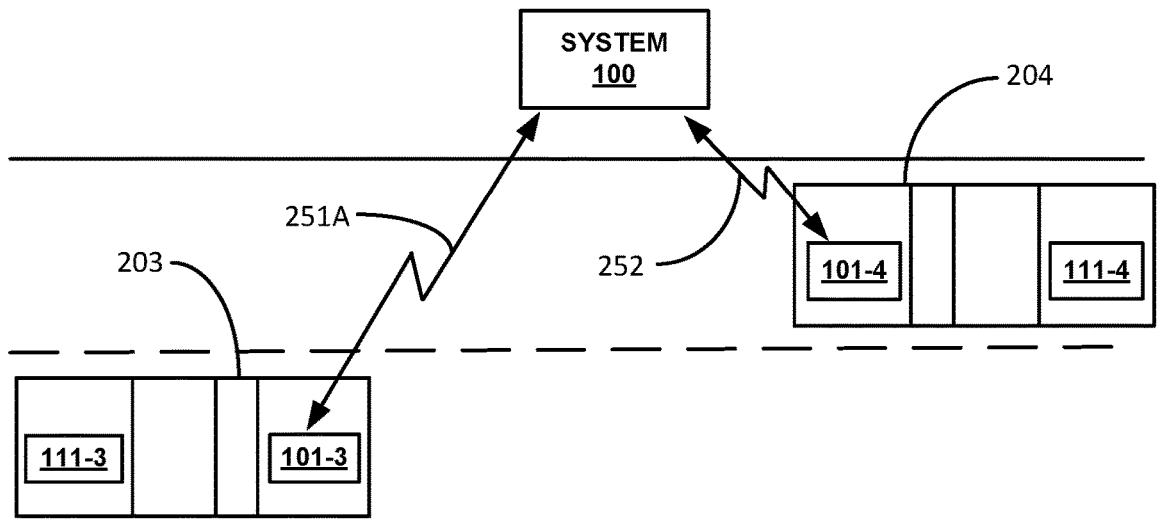

FIG. 4B shows the use of a system for sharing convergence data in accordance with various embodiments. In FIG. 4B, vehicle 203 is equipped with a V2V system comprising convergence data server 101-3 and GNSS receiver 111-3 (e.g., an implementation of convergence data sharing system 110 as described above with reference to FIG. 3B). For the purpose of the following discussion, it is assumed that GNSS receiver 111-3 is operating in a converged state. In this example, vehicle 203 passes in the vicinity of convergence data sharing system 100, comprising a convergence data server as described above, and automatically discovers convergence data sharing system 100 using the V2V protocols. It is noted that convergence data sharing system 100 does not comprise a GNSS receiver and instead receives, stores, and disseminates convergence data from other converged GNSS receivers as they pass nearby. In accordance with various embodiments, when convergence data sharing system 110 of vehicle 203 has established a communication connection (e.g., 251A of FIG. 4B), it will convey that it does have convergence data. In accordance with various embodiments, when the convergence data sharing system of vehicle 203 receives a message from convergence data sharing system 100 indicating that it does not have convergence data, it will automatically access its data storage device and retrieve the latest convergence data. The convergence data sharing system of vehicle 203 will then automatically convey the convergence data to convergence data sharing system 100. It is again noted that this convergence data is time-tagged so that once the convergence data is no longer valid (e.g., 5 minutes after it has been generated), it will not be used to attempt to attain convergence of a non-converged GNSS receiver. Convergence data sharing system 100 will store this time-tagged convergence data in a data storage device.

At a later time (e.g., possibly when vehicle 203 is no longer present), a second vehicle 204 equipped with a convergence data sharing system comprising convergence data server 101-4 and GNSS receiver 111-4 passes convergence data sharing system 100. For the purposes of the following discussion, it is assumed that the GNSS receiver 111-4 of second vehicle 204 is not operating in a converged state and convergence data sharing system 100 is storing usable convergence data. Again, second vehicle 204 and convergence data sharing system 100 will automatically discover each other using the V2V protocols and establish a communication connection 252. Also, the convergence data sharing system of second vehicle 204 will convey that it does not have convergence data. Because convergence data sharing system 100 has received and stored convergence data from vehicle 203 that is still valid based upon the time-tag, convergence data sharing system 100 will automatically access its data storage device and convey the convergence data to the convergence data sharing system of second vehicle 204.

Figure 4C:
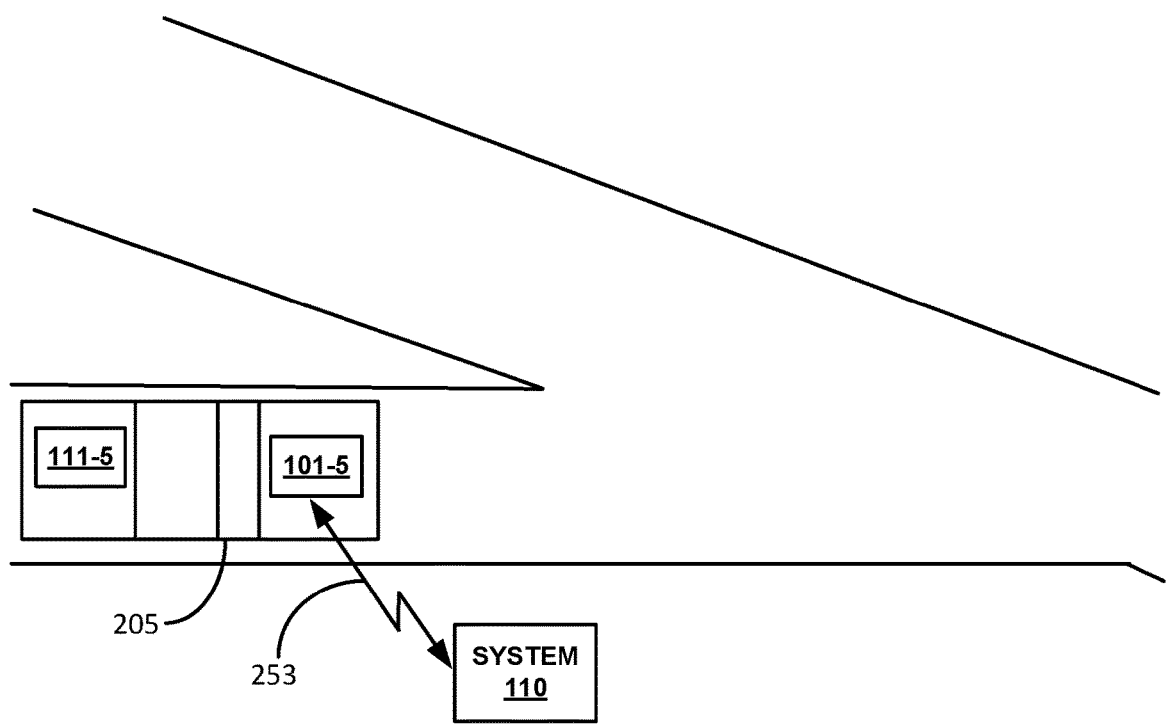

FIG. 4C shows the use of a system for sharing convergence data in accordance with various embodiments. In FIG. 4C, a convergence data sharing system 110 comprising a convergence data server and a GNSS receiver is located at an entrance ramp of a highway. A passing vehicle 205 is also equipped with a convergence data sharing system comprising convergence data server 101-5 and GNSS receiver 111-5. In accordance with various embodiments, the convergence data server of the roadside convergence data sharing system 110 and convergence data server 101-5 of vehicle 205 automatically discover each other using the V2V protocols and establish communications. Convergence data server 101-5 of vehicle 205 conveys to convergence data sharing system 110 that it needs convergence data. In accordance with various embodiments, the convergence data server of the roadside convergence data sharing system 110 will convey the convergence data to vehicle 205.

While the use of system 110 to share convergence data with non-converged GNSS receivers has been described with reference to a roadside convergence data sharing system, the convergence data sharing system can be located at any place where rapid convergence of a GNSS receiver is desired. For example, vehicles leaving a mine shaft or traffic tunnel will benefit from positioning of convergence data sharing system 110 at the exit as the code phase and carrier phase biases of respective GNSS signals can be lost when GNSS signals are blocked from a receiver. Other examples in which a convergence data sharing system 110 can be of benefit are locations where a vehicle may be shut off for an extended period of time and thus lose track of the code phase and carrier phase biases for respective GNSS signals. Some locations where this may prove beneficial include fire stations, police stations, parking structures, and vehicle storage yards (e.g., for construction equipment, agricultural vehicles, military vehicles, etc.). Thus, when a vehicle is started and begins to leave the location, it can receive convergence data rather than having to wait and generate its own convergence data using conventional processes.

Figure 4D:
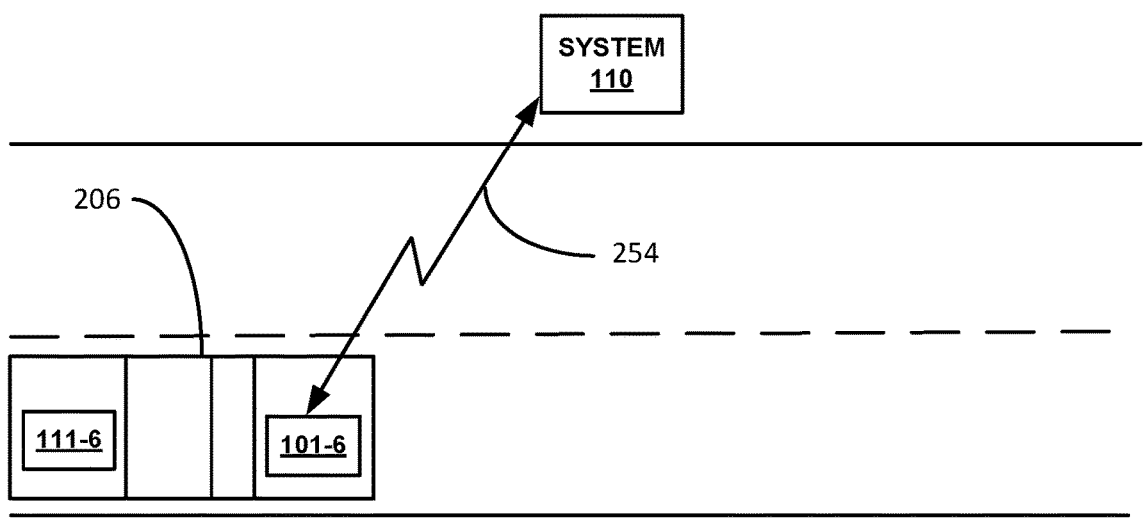

FIG. 4D shows the use of a system for sharing convergence data in accordance with various embodiments. In FIG. 4D, a vehicle 206 comprising a convergence data sharing system passes a roadside convergence data sharing system 110. The vehicle's convergence data sharing system comprises a convergence data server 101-6 and GNSS receiver 111-6, while the roadside convergence data sharing system 110 comprises a convergence data server and GNSS receiver. In the example of FIG. 4D, it is assumed that the convergence data sharing system of vehicle 206 is operating in a converged state while the roadside convergence data sharing system 110 is operating in a partially-converged state. This may occur, for example, if there has been a power outage that resulted in the roadside convergence data sharing system 110 losing track of GNSS signals. Upon restoration of power, the roadside convergence data sharing system 110 is therefore operating in a partially-converged state until it can autonomously determine the biases of the received GNSS signals. It is noted that while the roadside convergence data sharing system 110 may not have completely converged, it may still share those partially-converged biases with other systems in the vicinity, although with a degraded estimate of error associated with each of the received GNSS signals. This information may still prove useful to a GNSS receiver that has not yet resolved any biases of GNSS signals it has received. In the example of FIG. 4D, vehicle 206 passes by the roadside convergence data sharing system 110 prior to its having achieved convergence of its received GNSS signals.

In accordance with other embodiments, the convergence data server of the roadside convergence data sharing system 110 and convergence data server 101-6 of vehicle 206 automatically discover each other using the V2V protocols and establish communications. In the embodiment of FIG. 4C, the roadside convergence data server conveys to the convergence data sharing system of vehicle 206 that it needs convergence data. In accordance with various embodiments, the convergence data server 101-6 of vehicle 206 will convey the convergence data to roadside convergence data sharing system 110.

Figure 4E:
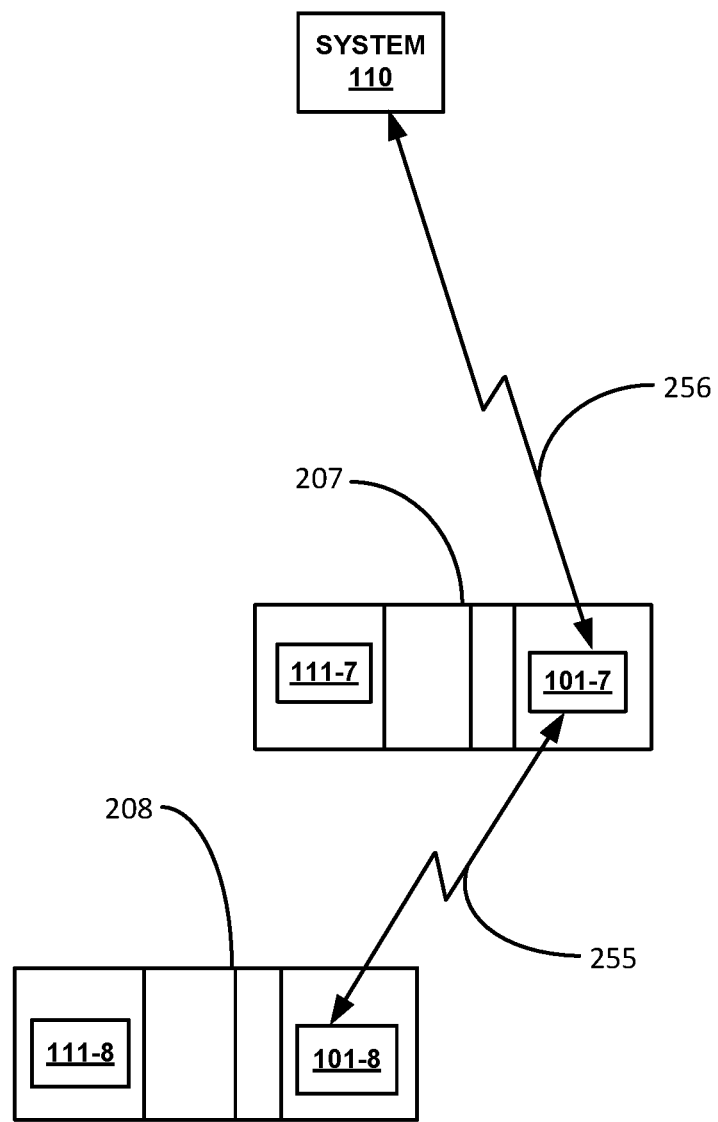

FIG. 4E shows the use of a system for sharing convergence data in accordance with various embodiments. In FIG. 4E, a convergence data sharing system 110 comprises a convergence data server and a GNSS receiver. A first vehicle 207 is equipped with a convergence data sharing system comprising convergence data server 101-7 and GNSS receiver 111-7. A second vehicle 208 is similarly equipped with a convergence data sharing system comprising convergence data server 101-8 and GNSS receiver 111-8. Various embodiments may be implemented with a wireless communication transceiver such as a cellular communication transceiver, or various implementations of a radio frequency transceiver such as implementations of the IEEE 802.15 (ZigBee) standard that have a longer range than a typical IEEE 802.11p transceiver. In accordance with various embodiments, a plurality of wireless convergence data servers can be implemented as a wireless mesh network communication system in which a first convergence data server can store and forward convergence data to a second convergence data server. In the example of FIG. 4E, it is assumed that vehicle 208 has lost convergence either due to obstructions interrupting tracking of GNSS satellites or because it has been shut down. Furthermore, while vehicle 207 is in communication with convergence data sharing system 110 via communication link 256, vehicle 208 is not in communication with convergence data sharing system 110. This may be due to having a short range communication device such as IEEE 802.11p transceiver or due to obstructions such as terrain that impede direct communication. In this example, convergence data server 101-7 of vehicle 207 can store convergence data it has received from convergence data sharing system 110 and forward it to convergence data server 101-8 of vehicle 208.

Figure 4F:
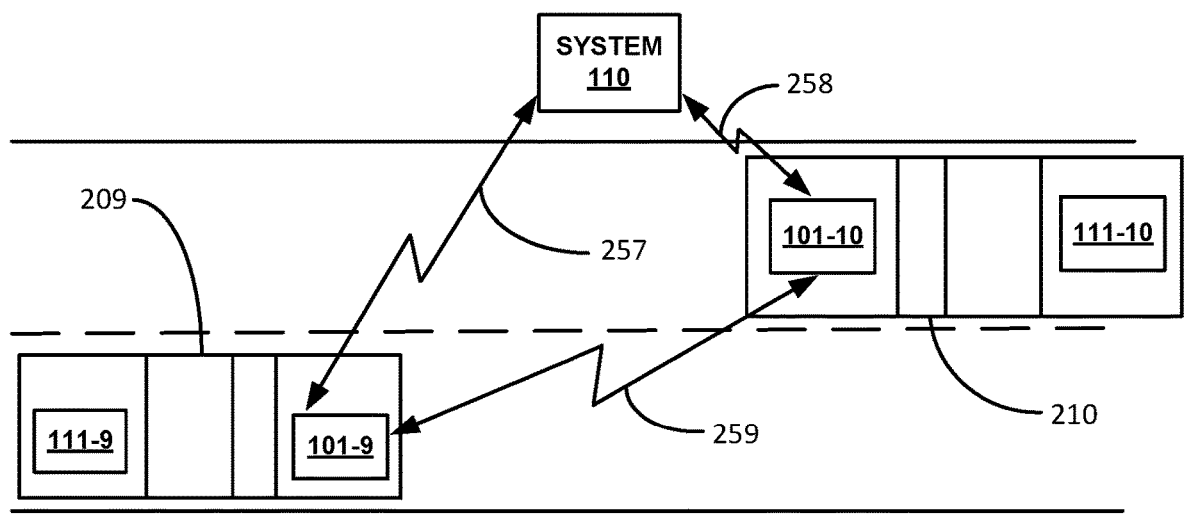

FIG. 4F shows the use of a system for sharing convergence data in accordance with various embodiments. In FIG. 4F, a convergence data sharing system 110 comprising a convergence data server and a GNSS receiver is located along a highway. A passing vehicle 209 is also equipped with a convergence data sharing system comprising convergence data server 101-9 and GNSS receiver 111-9. A second vehicle 210 is similarly equipped with a convergence data sharing system comprising convergence data server 101-10 and GNSS receiver 111-10. Convergence data server 101-9 is in communication with convergence data sharing system 110 and convergence data server 101-10 via communication links 257 and 259 respectively. Similarly, convergence data sharing system 110 is in communication with convergence data server 101-10 via communication link 258.

In this example, vehicle 210 may receive convergence data from both convergence data sharing system 110 and from convergence data server 101-9 of vehicle 209 at the same time. In accordance with various embodiments, for example, convergence data server 101-10 of vehicle 210 can select which convergence data to use based upon various criteria. In accordance with one embodiment, convergence data server 101-10 of vehicle 210 is configured to select convergence data based upon the baseline distance. In other words, the distance between GNSS receiver 111-10 and GNSS receiver 111-9 may be compared with the distance between GNSS receiver 111-10 and the GNSS receiver of convergence data sharing system 110 to determine which convergence data to use. As described above, in accordance with various embodiments, a given convergence data server may also convey its position fix with the convergence data. In accordance with various embodiments, convergence data server 101-10 of vehicle 210 may determine which convergence data server is closer to its current position and select that convergence data to use. In this example, vehicle 210 is closer to convergence data sharing system 110 than vehicle 209. Therefore, in this example, convergence data server 101-10 of vehicle 210 would use the convergence data received from convergence data sharing system 110.

It is noted that other criteria may be used by convergence data server 101-10 of vehicle 210 instead of, or in conjunction with, the baseline distance, to determine which convergence data to select in accordance with various embodiments. For example, convergence error estimates may be conveyed along with convergence data. The convergence error estimates may include how long continuous tracking of a given GNSS signal has been maintained. Typically, the longer a GNSS receiver has been continuously tracking GNSS signals from a given satellite, the more refined the solution of error estimates becomes. In other words, it is preferable to receive convergence data from a receiver that has been continuously tracking a given signal for a longer period. Thus, if vehicle 209 has recently passed under an overpass and lost tracking of a given signal, while convergence data sharing system 110 has maintained continuous tracking of that same signal, convergence data server 101-10 of vehicle 210 may select the convergence data from convergence data sharing system 110 based upon that criteria alone, or in conjunction with the baseline distance between receivers as described above.

Another criteria that can be used in determining which set of convergence data to use is the constellation intersection size. The constellation intersection size is the intersection of the sets of GNSS satellites concurrently tracked by two or more GNSS receivers. For example, GNSS receiver 111-10 of vehicle 210 may be tracking signals from a set of GNSS satellites numbered 1, 2, 3, 4, and 5; GNSS receiver 111-9 of vehicle 209 may be tracking signals from a set of GNSS satellites numbered 2, 3, 4, 5, and 6; and the GNSS receiver of convergence data sharing system 110 may be tracking signals from a set of GNSS satellites numbered 1, 3, 5, 6, 7, and 8. In the present example, GNSS receivers 111-9 and 111-10 are concurrently tracking signals from four satellites (e.g., satellites 2, 3, 4, and 5). Similarly, GNSS receiver 111-9 and the GNSS receiver of convergence data sharing system 110 are concurrently tracking signals from three satellites (e.g., satellites 1, 3, and 5). Thus, constellation intersection size for GNSS receivers 111-9 and 111-10 is greater. In this example, convergence data server 101-10 of vehicle 210 may select the convergence data from convergence data server 101-9 based upon the larger constellation intersection size.

Another criteria that can be used in determining which set of convergence data to use is receiver type. Similar receivers may have similar biases (e.g., estimates of antenna phase center and/or receiver measurement biases). Thus a receiver may choose convergence data from a similar receiver type.

Another criteria that can be used in determining which set of convergence data to use is age of convergence data. In some embodiments, newer convergence data (or convergence data that was obtained more recently), may be selected over older convergence data.

It is noted that embodiments may use other/additional criteria in selecting convergence data from a given source and/or combinations of criteria. Additionally, various criteria may be weighted to assist in determining which criteria is used in selecting convergence data. For example, a greater constellation intersection size may be given greater weight than baseline distance between receivers. Thus, while GNSS receiver 111-10 is closer to convergence data sharing system 110, the convergence data from convergence data server 101-9 may be selected due to the greater constellation intersection size.

Figure 5:
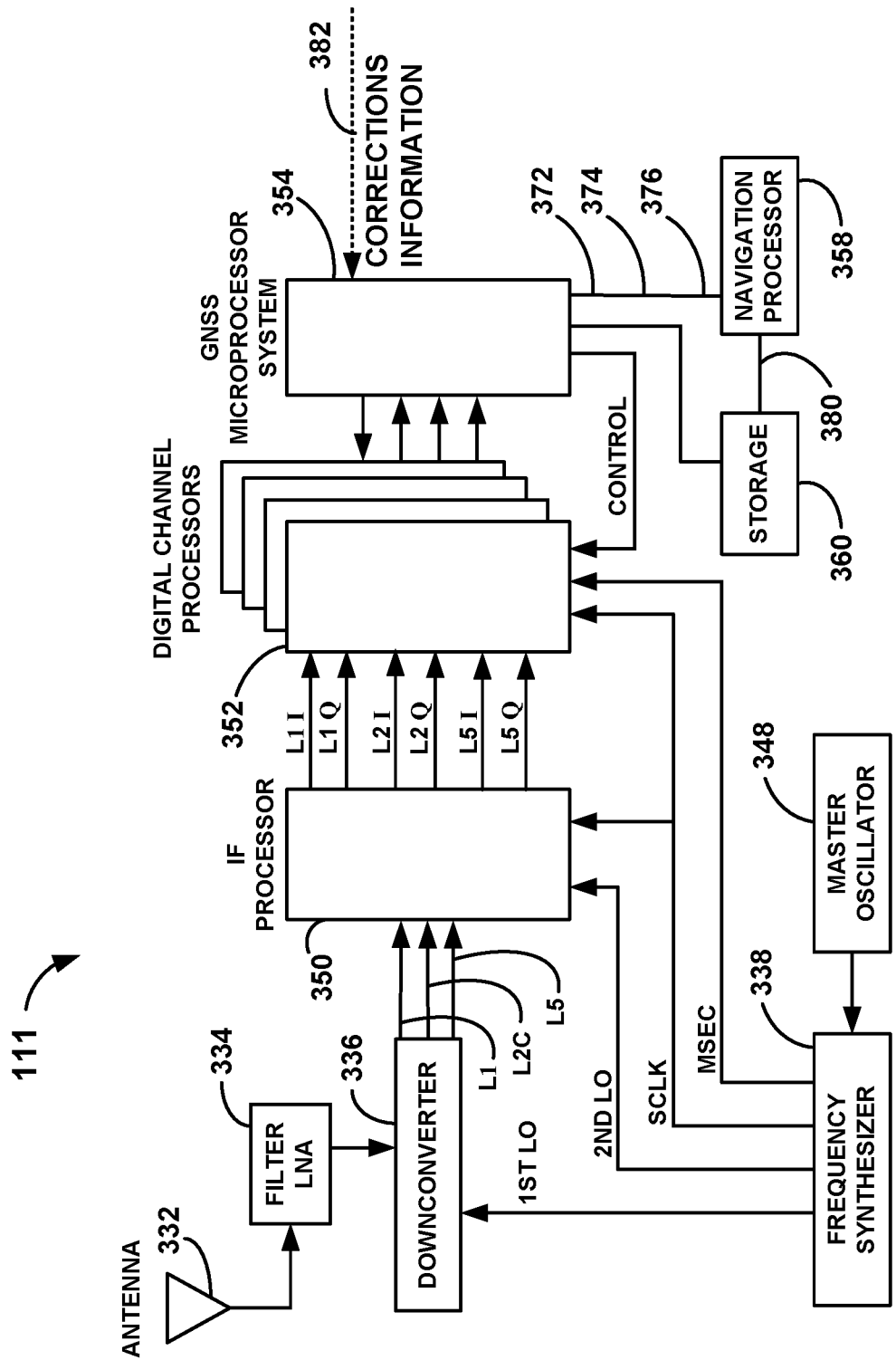
FIG. 5 is a diagram of an exemplary GNSS receiver that may be used in accordance with various embodiments.

With reference now to FIG. 5, a block diagram is shown of an exemplary GNSS receiver 111 that may be used in accordance with various embodiments described herein. In particular, FIG. 5 illustrates a block diagram of a GNSS receiver 111 in the form of a GPS receiver that is capable of demodulation of L1 and/or L2/L2C/L5 signal bands received from one or more satellites. A more detailed discussion of the function of a GNSS receiver can be found in U.S. Pat. No. 5,621,416, by Gary R. Lennen, titled "Optimized processing of signals for enhanced cross-correlation in a satellite positioning system receiver," which is incorporated herein by reference.

FIG. 5 shows an example where GPS signals (L1=1575.42 MHz, L2/L2C=1227.60 MHz, and L5=1176.45 MHz) enter GNSS receiver 111 through a multi-frequency antenna 332 (that may be disposed within a housing of GNSS receiver 111). Master oscillator 348 provides a reference oscillator that drives all other clocks in the system. Frequency synthesizer 338 takes the output of master oscillator 348 and generates clock and local oscillator frequencies used throughout the system. For example, in one embodiment, frequency synthesizer 338 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 334 performs filtering and low noise amplification of the signals. The downconvertor 336 mixes the L1, L2, and/or L5 signal bands in frequency down to approximately 175 MHz and outputs analog L1, L2, and/or L5 signal bands into an IF (intermediate frequency) processor 350. IF processor 350 takes the analog L1, L2, and/or L5 signal bands at approximately 175 MHz and converts them into digitally sampled in-phase (L1 I, L2/L2C I, and L5 I) and quadrature signals (L1 Q, L2/L2C Q, and L5 Q). It is noted that the carrier frequency bands discussed above are examples used in accordance with various embodiments and that other carrier frequency bands may be used in accordance with the present technology.

At least one digital channel processor 352 inputs the digitally sampled L1, L2/L2C, and/or L5 in-phase and quadrature signal bands. Each digital channel processor 352 is designed to digitally track the L1, L2/L2C, and/or L5 signal bands from one satellite by tracking code and carrier signals. Each digital channel processor 352 is also designed to form code and carrier phase measurements in conjunction with the GNSS microprocessor system 354. GNSS microprocessor system 354 is a computing device that facilitates tracking and measurements processes by providing pseudorange and carrier phase measurements for navigation processor 358. In one embodiment, GNSS microprocessor system 354 provides signals to control the operation of one or more digital channel processors 352. According to one embodiment, the GNSS microprocessor system 354 provides one or more of pseudorange information 372, Doppler Shift information 374, and Carrier Phase Information 376 to the navigation processor 358. One or more of pseudorange information 372, Doppler Shift information 374, and Carrier Phase Information 376 can also be obtained from storage 360. Alternatively, information can be obtained from outside of GNSS receiver 111 such as from a convergence data server. One or more of the signals 372, 374, and 376 can also be conveyed to a processor of an external device. In accordance with various embodiments, GNSS microprocessor system 354 is configured to output a position fix to a device outside of GNSS receiver 111. Additionally, GNSS microprocessor system 354 can output a position, velocity, and time (PVT) solution to a device outside of GNSS receiver 111. Navigation processor 358 performs the higher level function of combining measurements in such a way as to produce position, velocity and time information for differential and surveying functions, for example, in the form of a position fix 380. Storage 360 is coupled with navigation processor 358 and GNSS microprocessor system 354. It is appreciated that storage 360 may comprise a volatile or non-volatile storage such as a RAM or ROM, or some other computer readable memory device or media.

In some embodiments, GNSS microprocessor system 354 and/or navigation processor 358 receive additional inputs such as correction data (e.g., 382). According to one embodiment, examples of the correction data are WAAS corrections, differential GPS corrections, RTK corrections, PPP corrections, signals used by the Enge-Talbot method, EGNOS corrections, and wide area augmentation system (WAAS) corrections among others.

Although FIG. 5 depicts a GNSS receiver 111 with GPS navigation signal bands L1, L2/L2C, and L5, various embodiments are well suited for different combinations of navigational signals used by other GNSS systems. For example, according to one embodiment, the GNSS receiver 111 may only have an L1 navigational signal band. According to other embodiments, GNSS receiver 111 may use other combinations of navigation signal bands.

Figure 6:
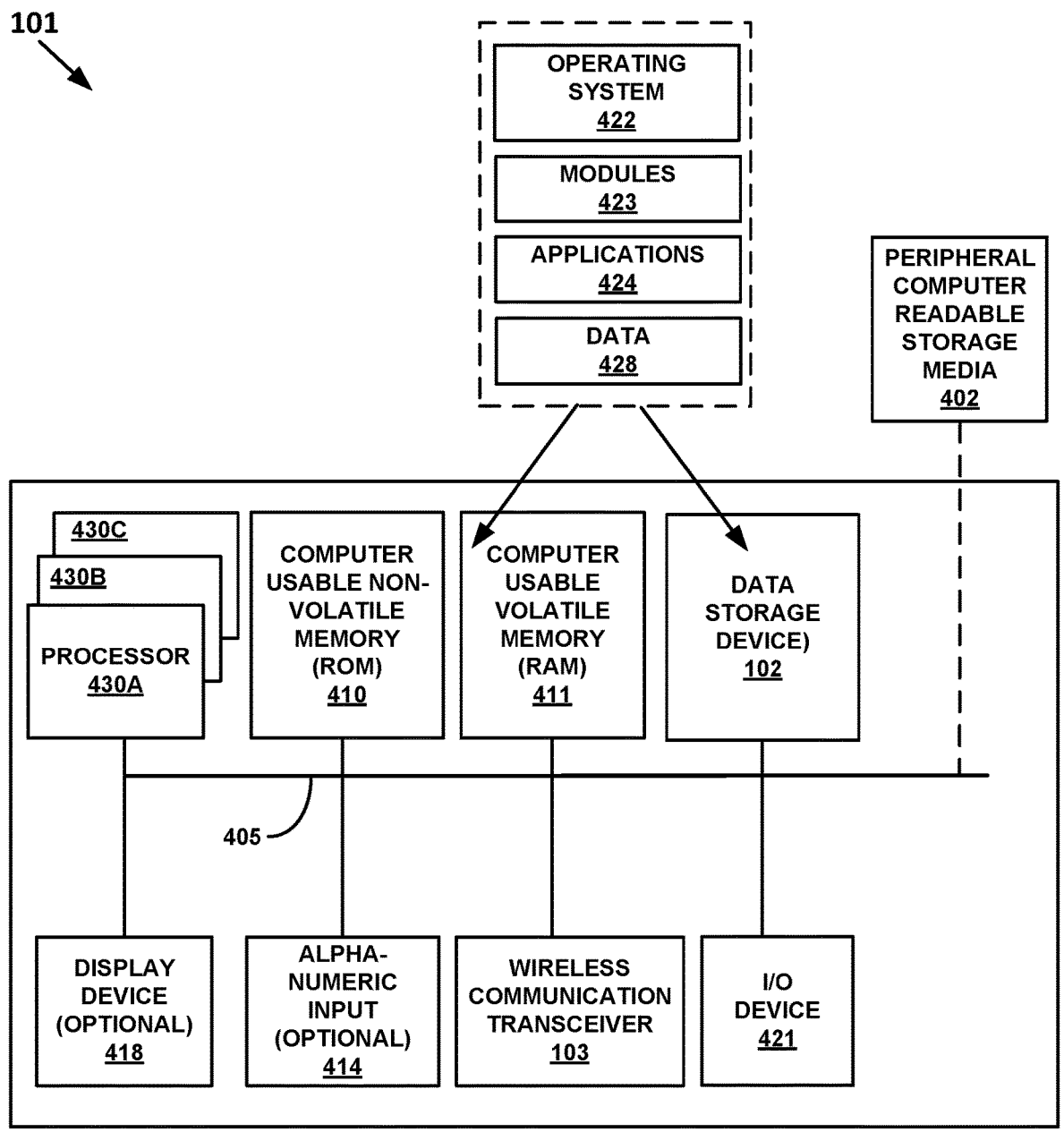
FIG. 6 is a diagram of an exemplary convergence data server that may be used in accordance with various embodiments.

With reference now to FIG. 6, all or portions of some embodiments described herein may be composed of computer-readable and computer-executable instructions that reside, for example, in non-transitory computer-usable/computer-readable storage media of a convergence data server 101. That is, FIG. 6 illustrates one example of a type of convergence data server 101 that may be used in accordance with or to implement various embodiments of a convergence data server that are described herein. It is appreciated that convergence data server 101 of FIG. 6 is only an example and that embodiments described herein can operate on or within a number of different systems including, but not limited to, embedded computer systems, server devices, various intermediate devices/nodes, vehicular navigation systems, handheld computer systems, and the like. Convergence data server 101 of FIG. 6 is well adapted to having peripheral computer-readable storage media 402 such as, for example, a floppy disk, a compact disc, digital versatile disc, universal serial bus "thumb" drive, removable memory card, and the like.

Convergence data server 101 of FIG. 6 includes an address/data bus 405 for communicating information, and a processor 430A coupled to bus 405 for processing information and instructions. As depicted in FIG. 6, convergence data server 101 is also well suited to a multi-processor environment in which a plurality of processors 430A, 430B, and 430C are present. Conversely, convergence data server 101 is also well suited to having a single processor such as, for example, processor 430A. Processors 430A, 430B, and 430C may be any of various types of microprocessors. Convergence data server 101 may also include data storage features such as a computer usable volatile memory 411, e.g., random access memory (RAM), coupled to bus 405 for storing information and instructions. Convergence data server 101 may also include computer usable non-volatile memory 410 (e.g., read only memory (ROM)) coupled to bus 405 for storing information and instructions for processors 430A, 430B, and 430C. Also present in convergence data server 101 is a data storage device 102 (e.g., a magnetic disk, optical disk, or hard disk drive) coupled to bus 405 for storing information and instructions. Convergence data server 101 may also include an optional alphanumeric input device 414 including alphanumeric and function keys coupled to bus 405 for communicating information and command selections to processor 430A or processors 430A, 430B, and 430C. In one embodiment, convergence data server 101 may also include an optional display device 418 coupled to bus 405 for displaying information. It is noted that in accordance with various embodiments, operations related to convergence sharing may be implemented by processor(s) 430A, 430B, and 430C.

Convergence data server 101 may also include an I/O device 421 for coupling convergence data server 101 with external entities such as, but not limited to, GNSS receiver 111 and/or a cloud computing network. Although not depicted, in some embodiments convergence data server 101 may include a GNSS receiver 111, which may be coupled with bus 405. In accordance with various embodiments, I/O device 421 may comprise one or more interfaces with various networked devices. Examples of networks with which I/O device 421 may be coupled include, but are not limited to, Ethernet port(s), universal serial bus (USB) ports, and/or special purpose interfaces. For example, in one embodiment, I/O device 421 may comprise a modem for enabling wired or wireless communications between convergence data server 101 and an external network such as the Internet and/or cloud computing network 121.

Referring still to FIG. 6, various other components are depicted for convergence data server 101. Specifically, when present, an operating system 422, applications 424, modules 423, and/or data 428 are shown as typically residing in one or some combination of computer usable volatile memory 411 (e.g., RAM), computer usable non-volatile memory 410 (e.g., ROM), and data storage device 102. In some embodiments, all or portions of various embodiments described herein are stored, for example, as an application 424 and/or module 423 in memory locations within RAM 411, computer-readable storage media within data storage device 102, peripheral computer-readable storage media 402, and/or other tangible computer readable storage media. In the embodiment of FIG. 6, convergence data server 101 may also include a wireless communication transceiver that is coupled with bus 405.

It is noted that convergence data server 101 may utilize multiple wireless communication transceivers operable in separate and distinct wireless communication networks, such as a first wireless communication transceiver compliant with the IEEE 802.11p specification for implementing a DSRC communication network, and second wireless communication transceiver comprising a cellular transceiver.

Unless otherwise specified, one or more of the various embodiments described herein can be implemented as hardware, such as circuitry, firmware, or computer readable instructions that are stored on a non-transitory computer readable storage medium. The computer readable instructions of the various embodiments described herein can be executed by a hardware processor, such as central processing unit, to cause convergence data server 101 to implement the functionality of the various embodiments. For example, one embodiment may comprise a non-transitory computer readable storage medium having computer readable instructions stored thereon for causing a computer system (e.g., convergence data server 101 or other computer system) to perform a methods described herein.

Figure 7:
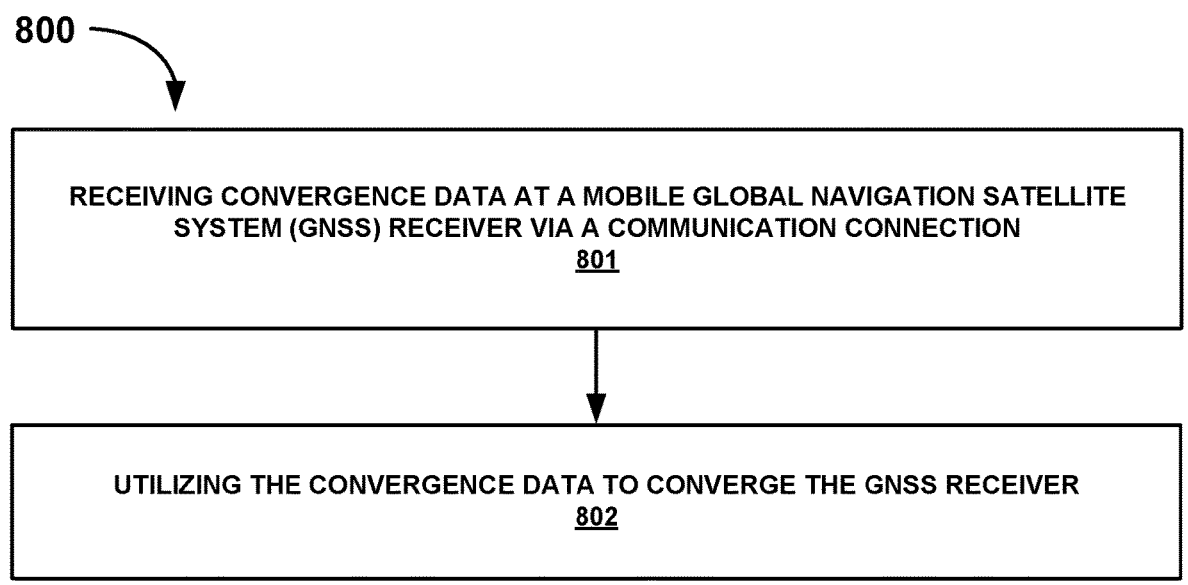
FIG. 7 is a flowchart of a method for sharing convergence data in accordance with various embodiments.

FIG. 7 is a flowchart of a method 800 for sharing convergence data in accordance with various embodiments. In operation 801 of FIG. 7, convergence data is received at a mobile GNSS receiver via a communication connection. In various embodiments, the convergence data server conveys convergence data to a converged or non-converged GNSS receiver or to another server.

In operation 802 of FIG. 7, the convergence data is used to converge the mobile GNSS receiver. As discussed above, a GNSS receiver operating in a non-converged state can use the received convergence data to achieve convergence of its GNSS receiver almost instantly upon reception of the convergence data.

It is noted that in accordance with various embodiments, authentication procedures may be implemented between convergence data servers to prevent spoofing. This prevents the introduction of false convergence data into the system. Furthermore, the convergence data may be encrypted or subjected to an encryption hash function to prevent spoofing or un-authorized access to the convergence data sharing systems.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as examples of implementing the claims.

Unless specifically stated otherwise, as apparent from the foregoing discussions, it is appreciated that throughout the description, discussions utilizing terms such as "receiving," "utilizing," "determining," "deriving," "calculating," and "generating" refer to the actions and processes used to transform the state of a computer system, data storage system, storage system controller, microcontroller, hardware processor, or similar electronic computing device or combination of such electronic computing devices. The computer system or similar electronic computing device manipulates and transforms data represented as physical (electronic) quantities within registers and memories into other data similarly represented as physical quantities within the memories or registers or other such information storage, transmission, or display devices.

Various embodiments have been described in various combinations and illustrations. However, any two or more embodiments or features may be combined. Further, any embodiment or feature may be used separately from any other embodiment or feature. Phrases, such as "an embodiment" or "one embodiment," among others, are not necessarily referring to the same embodiment. Features, structures, or characteristics of any embodiment may be combined in any suitable manner with one or more other features, structures, or characteristics.

What is claimed is:

1. A method for sharing convergence data between Global Navigation Satellite System (GNSS) receivers, the method comprising:

receiving convergence data at a first mobile GNSS receiver from a second mobile GNSS receiver, the first mobile GNSS receiver operating in a non-converged state and the second mobile GNSS receiver operating in a converged state, the convergence data generated at the second mobile GNSS receiver using correction data from one or more base stations, the convergence data comprising at least one of correction bias errors estimated by the second mobile GNSS receiver or correction data refined using the correction bias errors estimated by the second mobile GNSS receiver, wherein the correction bias errors comprise adjustments to at least one of orbit models or satellite clocks provided with the correction data from the one or more base stations;

and thereafter determining a position of the first mobile GNSS receiver using the convergence data from the second mobile GNSS receiver.

2. The method of claim 1 wherein at least one of the first mobile GNSS receiver or the second mobile GNSS receiver is associated with a vehicle.

3. The method of claim 1 wherein the convergence data is Precise Point Positioning (PPP) convergence data.

4. The method of claim 1 wherein the first mobile GNSS receiver is configured to receive GNSS signals in one frequency band, and the second mobile GNSS receiver is configured to receive GNSS signals in at least two separate frequency bands.

5. The method of claim 1 wherein the convergence data is received at the first mobile GNSS receiver using a wireless communication transceiver.

6. The method of claim 1 wherein the convergence data includes atmospheric models.

7. The method of claim 1 wherein the convergence data includes resolved carrier phase ambiguities.

8. The method of claim 1 wherein the convergence data indicates how long continuous tracking of GNSS signals from particular satellites has been maintained.

9. The method of claim 1 wherein the convergence data is generated at the second mobile GNSS receiver using PPP correction data from a network of base stations.

10. A system for sharing convergence data, comprising:

a convergence data server comprising:

a data storage device configured to store Precise Point Positioning (PPP) convergence data for a first mobile Global Navigation Satellite System (GNSS) receiver, the PPP convergence data generated by the first mobile GNSS receiver using correction data from one or more base stations, the PPP convergence data comprising at least one of correction bias errors estimated by the first mobile GNSS receiver or correction data refined using the correction bias errors estimated by the first mobile GNSS receiver, wherein the correction bias errors comprise adjustments to at least one of orbit models or satellite clocks provided with the correction data from the one or more base stations; and a communication transceiver coupled with said data storage device and configured to convey said PPP convergence data to a second communication transceiver; and a second mobile GNSS receiver operating in a non-converged state and coupled with the second communication transceiver and configured to use the PPP convergence data to converge said second mobile GNSS receiver.

11. The system of claim 10 wherein the first mobile GNSS receiver is disposed in a first vehicle and the second mobile GNSS receiver is disposed in a second vehicle.

12. The system of claim 10
wherein the second mobile GNSS receiver is arranged in a vehicle and the first mobile GNSS receiver is disposed in an infrastructure other than a vehicle.

13. The system of claim 10 wherein the second mobile GNSS receiver is configured to receive GNSS signals in at least two separate frequency bands.

14. The system of claim 10 wherein the communication transceiver and the second communication transceiver communicate via a wireless communication connection.

15. The system of claim 10 wherein the communication transceiver and the second communication transceiver are compliant with the Dedicated Short-Range Communications (DSRC) standard.

16. The system of claim 10 wherein the convergence data server comprises a cloud computing network.

17. A method for sharing convergence data between Global Navigation Satellite System (GNSS) receivers, said method comprising:

receiving Precise Point Positioning (PPP) convergence data at a first mobile GNSS receiver via a communication connection, the first mobile GNSS receiver operating in a non-converged state and the PPP convergence data provided by a second GNSS receiver operating in a converged state, the PPP convergence data generated by the second GNSS receiver using correction data from one or more base stations, the PPP convergence data comprising at least one of correction bias errors estimated by the second GNSS receiver or correction data refined using the correction bias errors estimated by the second GNSS receiver wherein the correction bias errors comprise adjustments to at least one of orbit models or satellite clocks provided with the correction data from the one or more base stations; and utilizing the PPP convergence data to determine a position of the first mobile GNSS receiver.

* * * * *